United States Patent Office 3,702,233
Patented Nov. 7, 1972

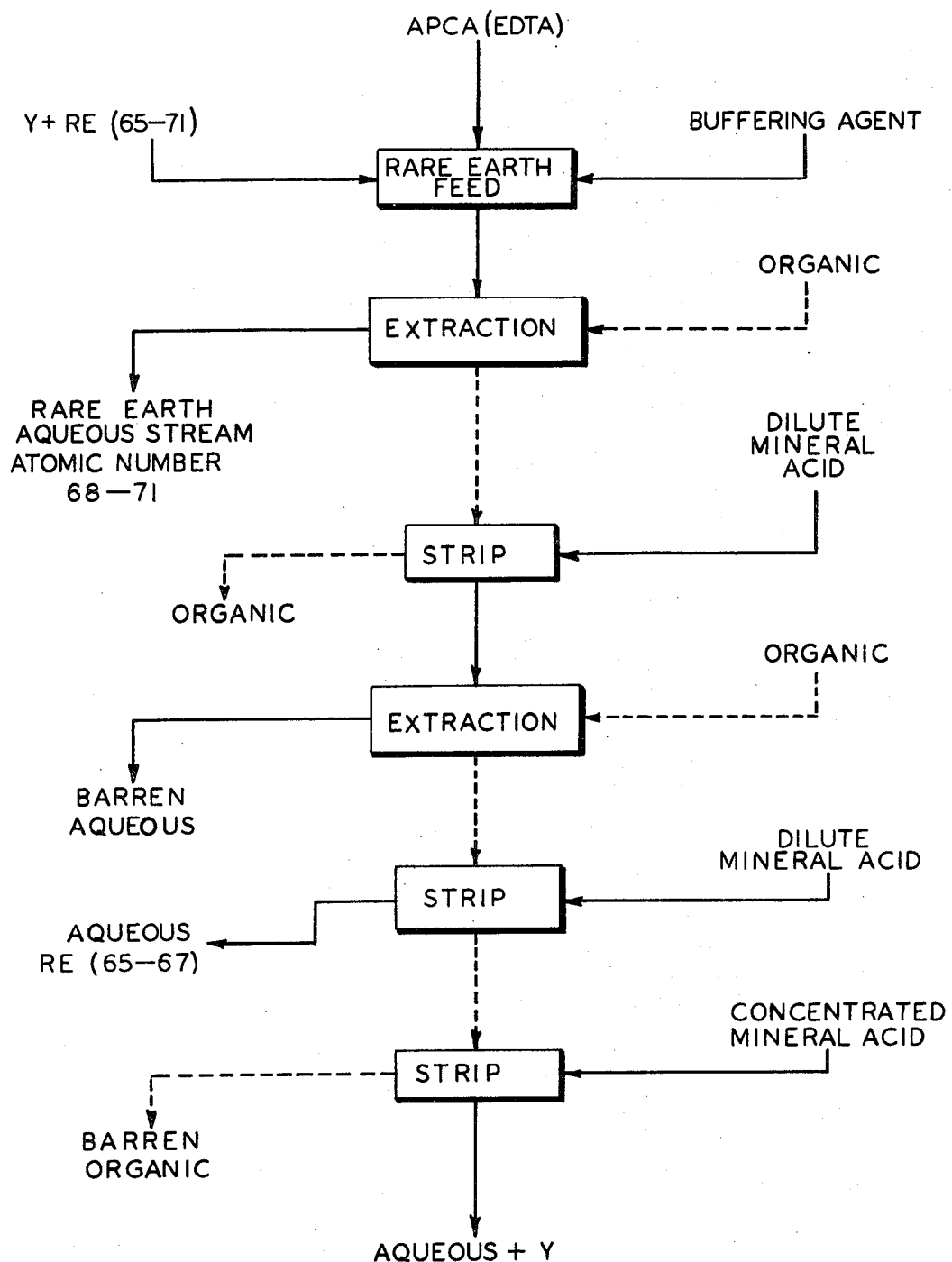

3,702,233
YTTRIUM PURIFICATION
J. R. Gump, Alma, Mich., and Tai K. Kim and Robert E. Long, Jr., Towanda, Pa., assignors to GTE Sylvania Incorporated
Filed Aug. 11, 1971, Ser. No. 170,744
Int. Cl. C22b 59/00
U.S. Cl. 23—23     4 Claims

ABSTRACT OF THE DISCLOSURE

A solvent extraction process for separating yttrium from heavy rare earths having atomic number 65 through 71 is disclosed that comprises using an aminopolycarboxylic acid and a buffering agent in the aqueous phase followed by a two-step organic extraction process whereby yttrium and heavy rare earths having atomic number 65 and 67 are first separated from heavy rare earths having atomic numbers 68 through 71 and after stripping and a second extraction, a dilute mineral acid is used to strip heavy rare earths, atomic numbers 65 through 67, from the yttrium-bearing organic and purified yttrium is then recovered by a concentrated mineral acid.

BACKGROUND OF THE INVENTION

This invention relates to a solvent extraction process for purifying yttrium from heavy rare earth impurities. More particularly, it relates to a two-step solvent extraction process for separating yttrium from rare earths having atomic numbers of 65 through 71.

Because yttrium and the rare earth elements occur together and are chemically similar, it is difficult to obtain yttrium free of rare earth impurities. One successful technique disclosed in Gump's U.S. Pat. 3,482,932 assigned to the assignee of this application used in this purification is to separate yttrium and the heavy rare earths (terbium through lutetium, atomic numbers 65 through 71) from the light rare earths using a solvent extraction process employing an organic phase consisting of mono-di-tridecylphosphoric acid, a neutral organophosphorus compound, and a hydrocarbon diluent. A nitrate system is the aqueous phase. The yttrium and heavy rare earth values recovered from the organic phase of the solvent extraction process are passed through an ion-exchange system using the ammonium salt of hydroxylethylenediaminetriacetic acid (HEDTA) as the eluting agent to effect the separation of yttrium from the heavy rare earths. Although this method yields a relatively pure yttrium oxide, it is generally relatively time-consuming, requiring possibly 15–25 days, and therefore, relatively expensive.

Other solvent extraction processes have not heretofore achieved the degree of purification required by the ultimate users of the yttrium based luminescent materials.

It is believed a solvent extraction process that provides a highly pure yttrium which process is less time-consuming than the ion exchange process is an advancement in the art.

OBJECTS AND SUMMARY OF THE INVENTION

It is an object of this invention to provide a solvent extraction process for the purification of yttrium containing heavy rare earth impurities.

It is a further object to provide a less time-consuming yttrium purification process than the ion-exchange process heretofore used for the separation of yttrium from heavy rare earths.

In accordance with one aspect of this invention there is provided a process for separating yttrium from rare earth impurities having atomic numbers from 65 to 71. The process comprises contacting an aqueous mineral acid solution containing yttrium and the impurities which also contains an aminopolycarboxylic acid and a buffering agent to maintain the solution pH within the 2.3 to 4.0 range with a first organic extraction phase comprising an alkyl phosphoric acid, an organophosphorus compound and a hydrocarbon diluent. Yttrium is preferentially extracted and the heavy rare materials having atomic numbers of 68 through 71 are separated from the yttrium. Stripping the yttrium values from the organic extractant with a mineral acid forms a second acid media containing yttrium and heavy rare earth materials having atomic number 65 through 67 which is contacted with a second organic extractant solution containing the same components as the first organic extractant solution in slightly different ratios. The yttrium and impurities with atomic numbers 65–67 are extracted by the organic. Upon stripping, with a relatively weak mineral acid such as from about 0.1 N to about 1 N, the impurities are removed from the organic while yttrium is not stripped. Contacting the organic with a more concentrated mineral acid, such as one from about 1 to about 6 normal removes the yttrium from the organic in a relatively pure state.

BRIEF DESCRIPTION OF THE DRAWING

The attached drawing illustrates a typical flow sheet of the process of this invention.

DESCRIPTION OF THE PREFERRED EMBODIMENTS

For a better understanding of the present invention, together with other and further objects, advantages, and capabilities thereof, reference is made to the following specification and appended claims in connection with the aforedescribed drawing.

In the process of this invention, two distinct solvent extraction steps are used. The extraction step employs the addition of an aminopolycarboxylic acid, such as EDTA and HEDTA, as a chelating agent, and a buffer sytem to a first aqueous solution of the heavy rare earths and yttrium in a mineral acid medium. The solution is contacted with a first organic extractant phase comprising a mono- or di-substituted alkyl phosphoric acid, as the active organic reagent; a neutral organophosphorus compound, as the solubilizer for the organic phase, and a hydrocarbon diluent. The aminopolycarboxylic acid, preferably EDTA or HEDTA, complexes the heavy rare earths at the pH of the aqueous solution. The heavy rare earths are rendered less extractable to different degrees depending upon their atomic number by the organic phase as a result of this complexation. Yttrium, however, is not as readily complexed by the aminopolycarboxylic acid, and thus is extracted into the organic phase. The importance of the buffer system should be emphasized. If a buffer system is not added to the feed solution, changes in acidity of the feed solution during extraction will cause the chelate-rare earth complex to weaken, thus allowing most of the rare earths to be extracted into the organic phase more readily and preventing the attainment of the desired separation. The yttrium values are recovered from the organic phase by re-extraction with dilute mineral acid solutions at the pH specified, the yttrium recovered as product from this step will be substantially free of the heavy rare earths from erbium through lutetium, atomic numbers 68 through 71, depending upon which chelating agent is used.

The product obtained is then used as feed material for the second extraction step of the procedure. The yttrium fraction, containing rare earth impurities of terbium, dysprosium and holmium, is dissolved in a second mineral acid medium. The medium after dissolution of yttrium and the terbium, dysprosium and holmium impurities is the second aqueous feed solution. This second feed solution is contacted with a second organic phase comprising a mono- and di-substituted alkylphosphoric acid, as the active organic reagent; a neutral organophosphorus compound, as the solubilizer; and a hydrocarbon diluent in differing proportions than the first organic solution. This second organic phase will extract both the yttrium and the middle and heavy rare earth impurities.

A dilute mineral acid (from 0.1 to 1.0 N mineral acid) does not efficiently re-extract yttrium from the second organic phase; however, it will remove the terbium, dysprosium and holmium from the second organic phase. After these impurities are removed, the yttrium is recovered from the second organic phase by contacting it with a more concentrated mineral acid solution from about 1 to about 6 normal.

First solvent extraction step of the invention

The active organic ingredient in the first organic extraction solution is a mono- or di-substituted alkyl phosphoric acid,

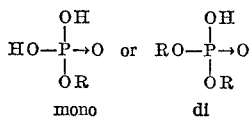

where R represents an alkyl group containing 9 to 16 carbon atoms. Due to the current state of technology the active ingredient is generally a mixture of the mono- or the di-substituted compounds, however pure compounds can be used.

A neutral organophosphorus compound is used as a modifier or solubilizer in the organic phase. Most effective in this family of compounds are organophosphines, organophosphates, organophosphonates, and organophosphine oxides.

A hydrocarbon solvent or inert diluent is also used in the organic phase. Kerosene or xylene are generally preferred, but the choice is not limited only to those.

Ranges and optimum values for the concentrations in the first organic phase are from about 5% to 20% (by volume) of mono- or di-substituted alkylphosphoric acid with about 8 to about 12% being preferred. About 5% to 20% by volume of an organophosphorus compound solubilizer or modifier is used, with from about 8 to about 12% being preferred. The balance of the solution is the hydrocarbon diluent.

The first aqueous phase comprises an aminopolycarboxylic acid, a buffer and the rare earth solution. The preferred aminopolycarboxylic acids are ethylene-diamine-tetraacetic (EDTA) and hydroxyethylenediamine triacetic acid (HEDTA), however, others such as diethyltriaminepentaacetic acid (DTPA) and the like can be used as the chelating agent in the aqueous phase. Range and optimum concentrations of the aminopolycarboxylic acid depends on many factors such as volume used, pH, amount of feed, and other conditions. However, the range is generaly from 1% to 8% (by weight), with an optimum from about 2% to about 4% depending on the factors mentioned.

A buffer system is used to keep the pH of the aqueous solution constant. The pH range can vary between 2.3 and 4.0, with an optimum about 3.5 to about 3.7. This range and optimum value, however, is somewhat dependent on other conditions such as concentrations of feed, concentration of chelating agent, the ratio of the volume of aqueous phase to the volume of organic phase. Ammonium acetate and glacial acetic acid buffer systems are preferred, however, any buffer system can be used which will keep the pH in the desired range and does not interfere with the separation.

The yttrium and rare earth solution is prepared by dissolving the rare earth and yttrium material in a mineral acid solution. Nitric acid is the preferred medium, although either sulfuric or hydrochloric could be used. The concentration of the rare earth and yttrium in the aqueous solution can range from about 20 g. rare earth oxide and yttrium oxide (REO)/liter to a saturated solution, with an optimum value of about 40 g. REO/liter. This range and optimum value is dependent on other conditions such as pH, the ratio of the volume of feed to the volume of organic extractant. Values stated above relate to a rare earth solution with a pH between about 1.0 and about 3.7.

The aqueous feed solution for this step is prepared by combining quantities of the aforementioned solutions. Preferred values are as follows:

| | Parts by volume |
|---|---|
| 2% EDTA solution | 120 |
| 1 N ammonium acetate | 80 |
| Glacial acetic acid | 20 |
| Deionized water | 20 |
| Rare earth solution, 40 g. REO/liter with a pH of about 1.5 | 60 |

The values, of course, can be varied but changing from these beforementioned levels can lead to a variety of problems such as different pH values, precipitation problems emulsion problems, and problems of reduced separation factors. For example, increasing the amount of rare earth solution from about 60 parts by weight to 90 parts by weight in the above preferred solution decreases the separation factors.

Stripping solutions

Dilute mineral acid solutions are used to re-extract metal values from the organic phase. Nitric, hydrochloric or sulfuric acids can be used. 3.0 N HCl has been found to be most effective for a single stage operation. However, if multiple contacts are made, a lower concentration of acid would be acceptable. This factor of acid concentration depends upon the ratio of the volume of acid to the volume of organic solution. Certain organophosphorus compounds require higher concentrations of acid and others require less concentrated acid solutions.

Second solvent extraction step of invention

The components of the second organic phase are identical to the components of the first organic phase in the first step of the invention.

The concentration of the alkyl-phosphoric acid can range from about 3.5 to about 35 percent (by volume) of the organic phase. The optimum concentration of this active ingredient of the organic phase is dependent on aqueous feed concentration, pH values, etc. and will vary according to feed. The neutral organophosphorus compound used as the modifier can range from about 2.5 to about 25 percent (by volume) of the organic phase. The optimum concentration of this solubilizer is dependent on aqueous feed concentration, pH values, etc. The hydrocarbon diluent is the remainder of the organic phase.

The aqueous rare earth feed solution is prepared by dissolving the yttrium from the first step in a mineral acid solution. Concentration can range from 2 to 150 g. REO/liter. The pH range can be from about 0.15 to about 4.0. Nitric acid is the preferred medium, however, sulfuric or hydrochloric can be used.

The stripping solutions, to reclaim the rare earth values from the organic phase, can be dilute mineral acid solutions of the same or different acid used for the aqueous feed. The concentration of the strip solutions can be varied from a pH value of about 1.0 to a concentration of about 6 N, with optimum values between about 1 N and about 3 N.

The following non-limiting examples will serve to illustrate the various aspects, advantages and features of the invention. All percentages, proportions and parts are by volume unless otherwise indicated.

EXAMPLE 1

A first aqueous solution is prepared as follows:

| | Parts |
|---|---|
| 2% EDTA solution (pH=4.4) | 120 |
| 1 M ammonium acetate solution | 80 |
| Glacial acetic acid | 20 |
| Deionized H$_2$O | 20 |
| Aqueous rare earth feed solution 40 g. REO/liter, pH=1.5, HNO$_3$ medium | 60 | and is contacted with the following organic phase in a 30:20 ratio of aqueous to organic, 10% (tridecyl phosphoric acid) TDPA
10% (tri-n-butyl phosphate) TBP
80% xylene Contact is for less than about 15 minutes. This procedure is repeated several times with the aqueous solution doped with radio-active isotopes of several of the heavy rare earths and yttrium. The following results were obtained:

| Rare earth | K$_d$ | Percent E | Separation factor from yttrium |
|---|---|---|---|
| Tb | 4.00 | 80.00 | 2.27 |
| Dy | 4.11 | 80.43 | 2.20 |
| Ho | 2.54 | 71.75 | 3.57 |
| Tm | 0.61 | 37.89 | 14.85 |
| Yb | 0.25 | 20.00 | 36.24 |
| Y | 9.06 | 90.00 | |

EXAMPLE 2

A study of the stripping ability of HNO$_3$ solutions, concentrations from 0.24 N to 3.93 N, with an organic phase loaded with rare earths is made. The loaded organic is prepared by contacting fresh organic solutions containing 28% TDPA–20% TBP–52% kerosene, with portions of feed solution (60 g. REO/liter, pH=1.5) doped with the desired rare earth isotope. To perform the stripping study, this loaded organic is then contacted with the desired stripping solution in a single-stage batch experiment. The following results were obtained:

| NHNO$_3$/percent of rare earth stripped | Gd | Tb | Dy | Ho | Tm | Yb | Y |
|---|---|---|---|---|---|---|---|
| 0.24 | 72.45 | 49.49 | 36.71 | 15.25 | 2.91 | 0 | 15.25 |
| 0.48 | 76.58 | 58.68 | 47.92 | 22.48 | 4.76 | 0.50 | 21.88 |
| 0.70 | 76.58 | 62.83 | 51.92 | 30.56 | 8.26 | 1.38 | 27.54 |
| 0.97 | 79.38 | 66.89 | 57.98 | 35.48 | 10.71 | 4.31 | 33.33 |
| 1.43 | 82.05 | 74.09 | 62.41 | 39.39 | 16.07 | 4.76 | 46.24 |
| 1.93 | 84.59 | 74.87 | 66.10 | 44.13 | 24.24 | 8.26 | 52.15 |
| 2.92 | 85.96 | 78.54 | 65.87 | 54.95 | 33.33 | 16.67 | 61.98 |
| 3.93 | 88.40 | 81.27 | 70.24 | 58.55 | 38.65 | 27.54 | 64.79 |

This example illustrates the feature of the second step of the process. The percentage stripping from the loaded organic increases with increasing acidity of the stripping solution. As the effective atomic number of the element increases, the effectiveness of any particular acid strip solution is decreased.

On this basis, it is possible to affect a separation between yttrium and some of the heavy rare earths.

EXAMPLE 3

1500 parts of the aqueous solution containing feed, as prepared in Example 1 are contacted with vigorous agitation for 15 minutes with 1000 parts of the organic phase of Example 1.

The loaded organic phase is stripped of its metal value by contacting with 2.0 N HNO$_3$ for about 1.5 minutes. The following results are obtained:

| Rare earth | Atomic number | Percent oxide starting material | Product | Raffinate |
|---|---|---|---|---|
| Y$_2$O$_3$ | | 67.4 | 91.0 | <64.0 |
| Dy$_2$O$_3$ | (66) | 0.70 | 0.65 | 0.70 |
| Ho$_2$O$_3$ | (67) | 0.58 | 0.66 | 0.80 |
| Er$_2$O$_3$ | (68) | 12.5 | 7.2 | 15.0 |
| Yb$_2$O$_3$ | (70) | 14.8 | <1.0 | >20.0 |

Thus, the use of this technique using EDTA effectively removes ytterbium and appreciably decreases the amount of erbium present in the product.

EXAMPLE 4

Three hundred parts of an aqueous solution is prepared as follows:

| | Parts |
|---|---|
| 4% HEDTA solution (pH=4.4) | 120 |
| 1 M ammonium acetate | 80 |
| Glacial acetic acid | 20 |
| Deionized water | 20 |
| Rare earth solution 40 g. REO/liter, pH approx. 1.5 HCl medium | 60 | are contacted with 200 parts of the following organic solution

10% (by volume) TDPA
10% TBP
80% xylene for about 1.5 minutes in a single shake-out experiment. The following results are obtained:

| Rare earth | Atomic number | Percent oxide starting material | Product | Raffinate |
|---|---|---|---|---|
| Dy$_2$O$_3$ | (66) | 4.0 | 2.0 | 14.2 |
| Ho$_2$O$_3$ | (67) | 1.7 | 1.1 | 4.3 |
| Er$_2$O$_3$ | (68) | 11.0 | 9.0 | 18.3 |
| Tm$_2$O$_3$ | (69) | 1.4 | 1.2 | 2.1 |
| Yb$_2$O$_3$ | (70) | 7.0 | 5.0 | 19.0 |
| Y$_2$O$_3$ | | 73.0 | 81.0 | 40.0 |

In this experiment, the concentration of several of the heavy rare earth impurities, particularly Dy and Ho, is decreased by using HEDTA as a complexing agent in the aqueous phase.

To further test the selective stripping technique, the mixer-settler system shown in FIG. 1 is operated. The flow rates and composition of solutions are:

| Solution | Composition | Flow rate, ml./min. |
|---|---|---|
| Organic | 28% TDPA–20% TBP–52% kerosene | 21 |
| Wash | Deionized water | 21 |
| Feed | 60 g. REO/liter pH approx. 1.0, approx. 75% Y$_2$O$_3$ | 8.5 |
| 1st strip | 0.5 N HNO$_3$ | 21 |
| 2nd strip | 2.0 N HNO$_3$ | 21 |

The following results are obtained by operating the system for 120 hours.

| Rare earth | Atomic number | Percent oxide starting material | Product | Raffinate |
|---|---|---|---|---|
| Tb$_4$O$_7$ | (65) | 0.15 | <0.1 | 0.60 |
| Dy$_2$O$_3$ | (66) | 4.1 | ~0.3 | >9 |
| Ho$_2$O$_3$ | (67) | 2.4 | 0.65 | 3.5 |
| Er$_2$O$_3$ | (68) | 8.7 | >10 | 3.5 |
| Yb$_2$O$_3$ | (70) | 6.6 | 11.6 | 1.5 |
| Y$_2$O$_3$ | | 74.8 | 72.6 | 75.0 |

Thus, the selective stripping process is effective for removal of terbium, dysprosium and holmium from the yttrium oxide product.

EXAMPLE 5

From the preceding examples, it is observed that the first part of the procedure (the chelate-buffer system) will separate the rare earths from erbium through leutetium from yttrium, while the second part (selective stripping) will separate terbium through holmium from yttrium. By a combination of these two procedures, typically illustrated in FIG. 1, it is possible to remove essentially all the heavy rare earth impurities from the yttrium. This combination of processes is performed on a batch of rare earth material, which is treated previously for removal of light rare earths, first with the chelate-buffer system, then the selective stripping procedure. These two procedures used the methods in Examples 3 and 4. The product from the chelate-buffer system is precipitated as oxalates, fired to oxides and re-dissolved in $HNO_3$ as feed for the selective stripping. The following results are obtained:

| Rare earth | Atomic number | Percent oxide starting material | Product from 1st procedure | Final product |
|---|---|---|---|---|
| $Dy_2O_3$ | (66) | 7.70 | 3.48 | ~0.3 |
| $Ho_2O_3$ | (67) | 1.10 | 0.58 | <0.25 |
| $Er_2O_3$ | (68) | 1.45 | 1.00 | 1.48 |
| $Yb_2O_3$ | (70) | <1.0 | <1.0 | ~0.4 |
| $Y_2O_3$ | | 84.0 | 92.6 | 98.44 |

While there has been shown and described what is at present considered the preferred embodiments of the invention, it will be obvious to those skilled in the art that various changes and modifications may be made therein without departing from the scope of the invention as defined by the appended claims.

What is claimed is:

1. A process for purifying yttrium having heavy rare earth impurities having atomic numbers 65 through 71 comprising
    (a) forming a first aqueous phase consisting essentially of an aqueous mineral acid medium having dissolved therein said yttrium and said heavy rare earth impurities,
    (b) adding an aminopolycarboxylic acid and a buffering agent to maintain said first aqueous phase at a pH of from about 2.3 to about 4,
    (c) contacting the resulting buffered aqueous phase with a first organic extractant solution comprising 5 to about 20% by volume of a mono- or di-substituted alkyl phosphoric acid containing at least one alkyl group having from 9 to 16 carbon atoms, 5 to about 20% by volume of a solubilizer comprising a neutral organophosphorous compound, and a hydrocarbon diluent as the balance of the solution to extract yttrium into said first organic phase,
    (d) contacting said first organic phase with a dilute mineral acid solution to strip yttrium which is substantially free of impurities having atomic weights of 68 through 71 to form a second aqueous phase,
    (e) contacting said second aqueous phase with a second organic phase consisting essentially of 3.5 to about 35% by volume of a mono- or di-substituted alkylphosphoric acid containing at least one alkyl group having from 9 to 16 carbon atoms, 2.5 to about 25% by volume of a solubilizer comprising a neutral organophosphorous compound and a hydrocarbon diluent as the balance of the solution to extract yttrium and heavy rare impurities having atomic numbers 65 through 67 into said second organic phase,
    (f) contacting said second organic phase with a 0.1 to 1.0 normal mineral acid solution to strip said impurities having atomic numbers 65 through 67 without stripping yttrium and
    (g) contacting said second organic phase with a mineral acid solution of from about 1 to about 6 normal to strip the resulting purified yttrium.

2. A process according to claim 1 wherein said aminopolycarboxylic acid is selected from the group consisting of ethylenediaminetetraacetic acid and hydroxyl-ethylenediamine triacetic acid.

3. A process according to claim 2 wherein said alkyl phosphoric acid is tridecyl phosphoric acid and said solubilizer is tri-n-butyl phosphate.

4. A process according to claim 3 wherein said buffering agent is ammonium acetate and acetic acid.

References Cited

UNITED STATES PATENTS

| | | | |
|---|---|---|---|
| 3,110,556 | 11/1963 | Peppard et al. | 23—23 |
| 3,482,932 | 12/1969 | Gump | 23—22 |
| 3,575,687 | 4/1971 | Drobnick et al. | 23—22 |
| 3,578,391 | 5/1971 | Chiola et al. | 23—22 |
| 3,598,520 | 8/1971 | Chiola et al. | 33—22 |
| 3,615,170 | 10/1971 | Hazen et al. | 23—22 |
| 3,615,171 | 10/1971 | Mason et al. | 23—22 |
| 3,658,486 | 4/1972 | Goto | 23—312 ME |

HERBERT T. CARTER, Primary Examiner

U.S. Cl. X.R.

23—22, 183, 312 ME